US006898512B1

(12) United States Patent
Ritter et al.

(10) Patent No.: US 6,898,512 B1
(45) Date of Patent: May 24, 2005

(54) OVERSPEED SHUT DOWN TEST FOR ELECTRONICALLY CONTROLLED ENGINE

(75) Inventors: Curtis P. Ritter, Dearborn, MI (US); Jeffrey A. Strauss, Spring Lake, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/752,754

(22) Filed: Jan. 6, 2004

(51) Int. Cl.[7] .......... F02D 9/00; G06F 15/02
(52) U.S. Cl. .......... 701/114; 701/110; 123/350
(58) Field of Search .......... 701/114, 110, 701/115, 102; 123/350, 352, 357

(56) References Cited

U.S. PATENT DOCUMENTS

| | | | | | |
|---|---|---|---|---|---|
| 3,828,742 A | * | 8/1974 | Weis | .......... | 123/351 |
| 4,387,679 A | * | 6/1983 | Folger et al. | .......... | 123/198 D |
| 4,529,932 A | * | 7/1985 | Doueihi et al. | .......... | 324/161 |
| 4,712,372 A | * | 12/1987 | Dickey et al. | .......... | 60/39.281 |
| 6,339,741 B1 | | 1/2002 | Ritter et al. | | |
| 6,457,466 B1 | | 10/2002 | Ritter et al. | | |
| 6,523,525 B1 | | 2/2003 | Hawkins | | |
| 2004/0117102 A1 | * | 6/2004 | Weir et al. | .......... | 701/100 |

* cited by examiner

*Primary Examiner*—Hieu T. Vo
(74) *Attorney, Agent, or Firm*—Reising, Ethington, Barnes, Kisselle, P.C.

(57) ABSTRACT

A method of testing a shut down system for an electronically controlled diesel engine including the steps of changing the primary or main rating to a test rating that runs at reduced nominal horsepower and at speeds higher than the overspeed trigger point to actuate the shut down system during the test.

12 Claims, 4 Drawing Sheets

OVERSPEED SHUT DOWN TEST FOR ELECTRONICALLY CONTROLLED ENGINE

TECHNICAL FIELD

The field of this invention relates to a method for testing automatic shut down components in an electronically controlled engine at overspeed conditions.

BACKGROUND OF THE DISCLOSURE

Mechanically governed diesel engines have long been used in hazardous and other sensitive environments. Hazardous environments include environments that have flammable or explosive vapors or dust such as those found in oil fields or in coal mines. The presence of these vapors and dust pose a possibility of a runaway condition of the engine due to ingestion of these ambient combustible vapors and dust through the air intake of the engine and subsequent combustion in the cylinders. Other sensitive environments may include use at or near heavily populated and enclosed sites such as in large or tall buildings with engines driving a water pump or generator.

For use in these hazardous or sensitive sites, various aftermarket components are installed on the engine to provide an engine shut down if there is an indication that the engine is not working properly, for example, it is in a runaway condition. For engine shut down in the event of a runaway condition, a shut down system may include closure of an intake air flap or actuation of a halon injection system as well as a fuel shut off system that is activated when the engine achieves or exceeds a trigger point; i.e., an actuation set point at a certain speed.

For many automatic shut down devices, various government or other certification agencies require periodic testing to determine if the shut down systems are properly working and properly maintained. For runaway speed shut down systems, these tests are often conducted at runaway speeds, for example, tested at 2400 rpm on a 2100 rpm rated engine. These runaway speed conditions are easily achieved on a mechanically governed engine by adjustment of the fuel rack to cause a runaway condition that reaches the trigger point. Once the overspeed runaway condition is met, it can be determined if the automatic shut down system operated according to expectation and specifications.

One of the great improvements to the diesel engine in recent times is the incorporation of electronic controls. These electronically controlled diesel engines, also referred to as electronically governed diesel engines, most commonly incorporate an electronic control module (ECM). The ECM is loaded with a set of running calibrations, most commonly referred to as a primary or main rating along with a droop component commencing at the full load speed when the horsepower output drops to zero at higher speeds. Electronic control modules provide many advantages over mechanically governed diesel engines, including more precise control of fuel, emission vapors, and various other engine functions and provide for better reliability and less maintenance of the control settings. In summary, electronically controlled diesel engines provide a more reliable, cleaner and more fuel efficient engine. As a consequence of the many advantages provided by electronic controls, the electronically controlled diesel engine has seen a great rise in popularity.

However, there are still many markets and applications that have not opened to these otherwise advantageous electronically controlled diesel engines. Electronically controlled diesel engines have not yet been allowed to be used in building basements for use as a water pump for fire control. In addition, oil fields and coal mines are still dominated by mechanically governed diesel engines.

The reasons for the lack of entry of the electronically controlled diesel engine in these particular marketplaces in spite of its obvious advantages in fuel economy, superior emission control and performance is due to a single cause; namely, there is no available test to determine the operability of the shut down system during overspeed. Once the calibrations have been set in the electronic control module, the controls to date have not provided for an overspeed testing of the shut down system or, for that matter, any type of testing of any shut down system that may be connected to the engine.

What is needed is a testing method for an electronically governed engine for determining the operability of an overspeed and other automatic shut down systems. What is also needed is a testing method for an electronically governed engine for determining the operability of an overspeed shut down system for the engine during actual overspeed conditions. What is also needed is a testing method that allows testing calibrations to be entered into the electronic control module to provide an output signal from the electronic control unit to actuate the overspeed shut down system.

SUMMARY OF THE DISCLOSURE

In accordance with one aspect of the invention, a method of testing an overspeed shut down system for an electronically controlled engine includes providing an electronic control module of the engine having a calibration that includes a primary rating that normally limits the operation of the engine to a predetermined full load rated speed and having a test rating that provides fueling to exceed the trigger point for the shut down system, i.e., in one embodiment set above the full load rated speed. The ECM actuates the shut down system when it senses the engine running faster than the set overspeed trigger point of the electronic control module of the engine is enabled for test rating that allows the engine to run at a speed reaching or exceeding the trigger point that automatically activates the shut down system during the testing. The engine runs with the test rating at a speed higher than the trigger point. At the end of the testing the electronic control module is reset to the primary rating.

Preferably, the method further includes switching between the primary rating providing a full load rated speed with a droop component above the full load rated speed but below the trigger point and the test rating providing a second substantially greater droop component to provide fueling of the engine to a speed that can reach or exceed the trigger point.

It is also preferable that the electronic control module is accessed through a computer device having security clearance features for switching the electronic control module between the primary and test ratings.

The method also preferably calls for unloading any external loads, for example, hydraulic pumps, alternators, air compressors, transmission or generators, before running the engine under the test rating. The test rating preferably is set at a horsepower that is minimally sufficient to overcome the parasitic loads or losses within the engine caused by needed components, for example, water pump, fuel pump or oil pump.

In accordance with another aspect of the invention, a method of testing an overspeed shut down system for an electronically controlled engine includes providing the electronic control module of the engine with a primary rating that normally limits the operation of the engine to a predetermined full load rated speed and an initial overspeed test rating having its test point normally set above the full load rated speed. An activation signal is provided to actuate the overspeed shut down system when the engine is running faster than the test point. Either the rating is changed or the trigger point is reset to allow the engine to run at speeds higher than the trigger point. The engine then runs with the changed rating or trigger point at a speed reaching or exceeding the trigger point to test if the overspeed shut down system operates in a proper manner. Upon completion of the overspeed test, the rating or trigger point is reset back to the initial condition.

In one embodiment, it is desirable that the changing of engine rating includes changing the droop amount from a normal limited amount, e.g., 150 rpm set below the overspeed trigger point to an increased amount of droop, e.g., 300 rpm which then exceeds the overspeed trigger point.

In another embodiment, the overspeed trigger point is reset to a test point to a speed below the full load rated speed of the primary rating or the droop speed of the primary rating such that a signal, digital, analog, frequency, or mechanical type, can be sent to activate the shut down system when the engine is running within the primary rating.

The electronic control module digital output for the shut down system preferably has a reverse polarity and is normally in a ground position and operable such that an open position activates the shut down system.

In one embodiment, it is also desirable that the changing of at least one of the rating and the overspeed trigger point includes setting the rating or trigger point at a remote secure computer and providing a communication link between the remote secure computer and the electronic control module.

In another embodiment, it is desirable to provide an electronic control module of the engine having a primary rating that normally limits the operation of the engine to a predetermined full load rated speed and an overspeed trigger point set above the full load rated speed for activating the shut down system and a normally inactive test rating to provide for a test speed above the full load rated speed and above the overspeed trigger point. A throttle command is provided to the electronic control module to activate the normally inactive test rating to provide the test speed to exceed the trigger point and activate the shut down system. After the test, the electronic control module is reset to inactivate the test rating and reverts the module to the primary rating with the normally inactive test rating.

BRIEF DESCRIPTION OF THE DRAWINGS

Reference now is made to the accompanying drawings in which.

DETAILED DESCRIPTION OF THE PREFERRED EMBODIMENT

Figure 1:
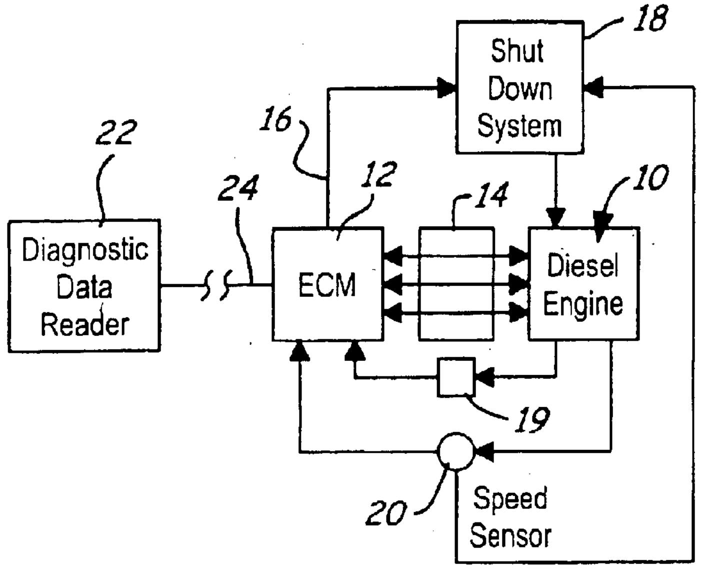
FIG. 1 is a schematic diagram of an electronically controlled diesel engine incorporating an overspeed shut down system and a calibration including a primary rating and test rating within the electronic control module.

Referring now to FIG. 1, an electronically controlled diesel engine 10 has an electronic control module (ECM) 12 operably mounted thereon for controlling various engine parameters such as injection rate, air intake, and cooling fans through the use of a conventional communication bus 14. The ECM 12 also has an output line 16 for providing a digital, analog, frequency or other actuation signal connected to a shut down system 18. The shut down system 18 can be one of a variety of known shut down systems. For example, the shut down system may be a shut down flap in the intake system, a Halon injector in the intake manifold, a fuel cutoff to the fuel injectors or a combination of more than one shut down device. The shut down system is preferably actuated by a digital output provided by the ECM 12 through the output line 16. The engine may be connected to various standard sensors 19 which have an output connected to the ECM. One of these sensors which is specifically indicated is a speed sensor 20.

Figure 2:
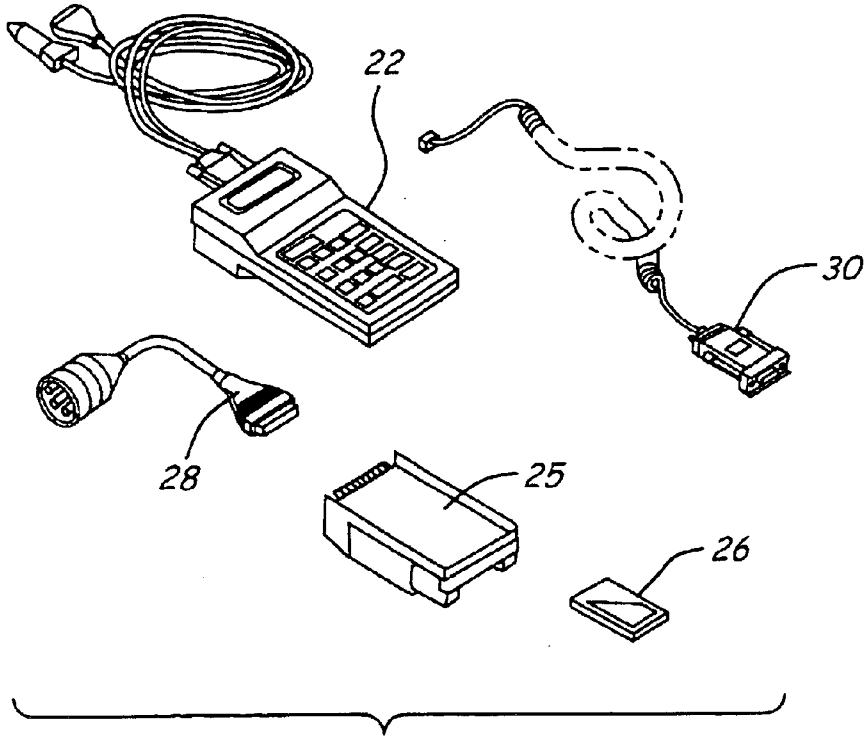
FIG. 2 is perspective view of a typical diagnostic data reader (DDR) for communicating with the electronic control module.
Figure 4:
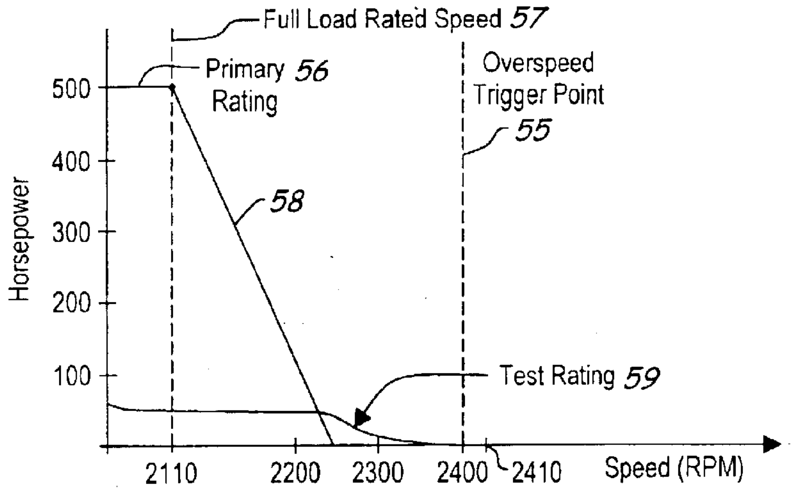
FIG. 4 is a schematic graph illustrating the primary rating, the test rating and the overspeed trigger point of the shut down system.

Referring now to FIG. 4, the ECM 12 has a normal overspeed trigger point 55 to cause an actuation of the output line 16 upon sensing an engine speed at or exceeding the overspeed limit trigger point 55 from the speed sensor 20. The ECM 12 also is normally calibrated with a primary rating 56 that provides a full load rated speed 57 below the overspeed trigger point 55 with a droop component 58 that is also limited to less than the overspeed trigger point 55. This primary rating is normally loaded into the ECM 12 by an engineering or distribution tool (not shown). A diagnostic data reader 22 shown in FIGS. 1 and 2 is removably connected to an input port 24 of the ECM. As shown in FIG. 2, the diagnostic data reader (DDR) 22 may have a multiprotocol cartridge (MPC) 25 that can be loaded with a specific application PC card 26 that can connect to the DDR through a 6 pin data link adaptor 28 and can also be connected to a standard PC adaptor 30. The data reader and accessories are well known and commonly used for switching between multiple engine ratings.

Figure 3:
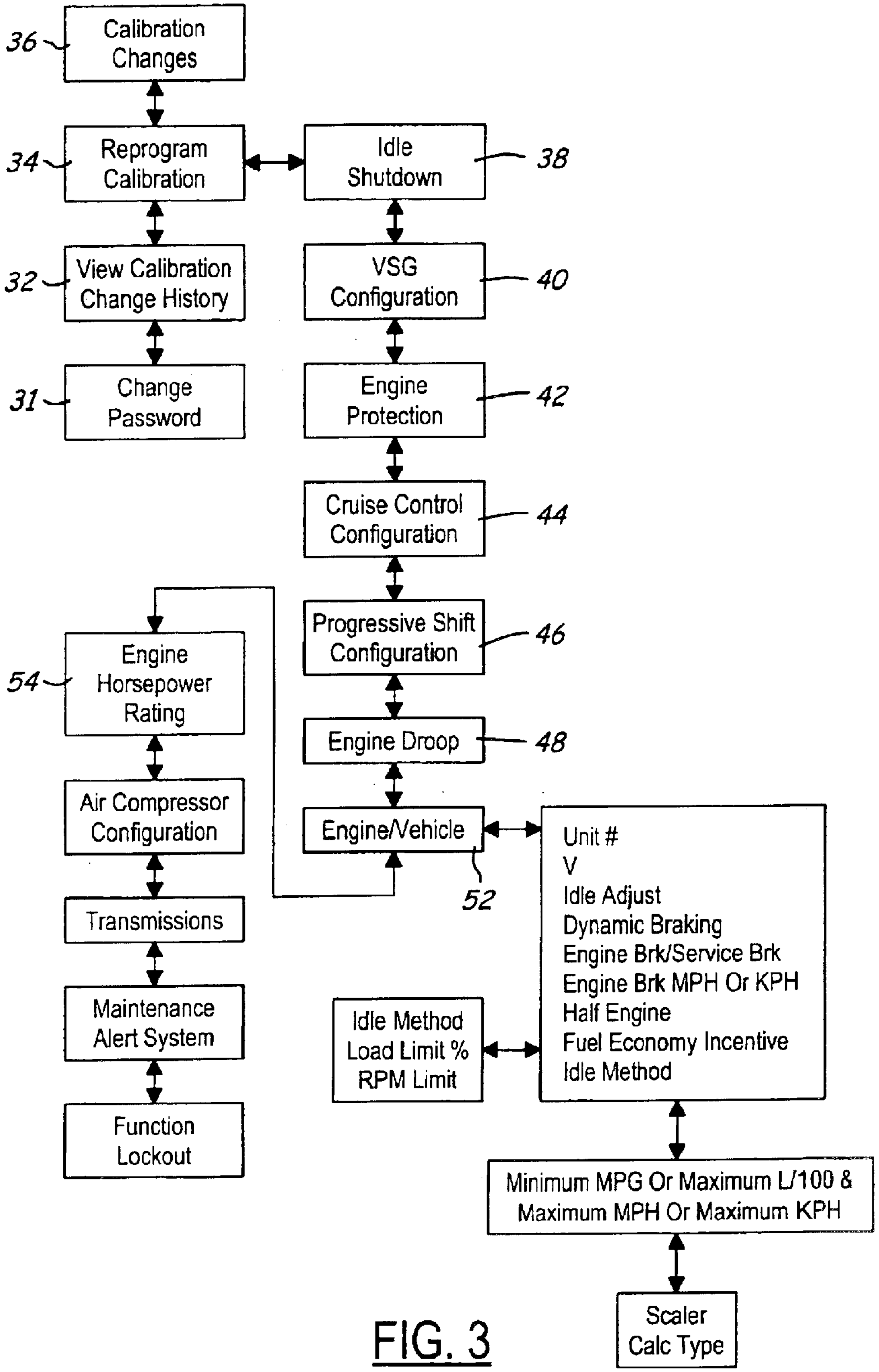
FIG. 3 is a schematic view of menus found in the DDR for entering the rating changes including droop and engine horsepower ratings.

FIG. 3 illustrates a general menu progression provided by the DDR when switching between ratings and changing engine droop within the ECM. The DDR provides password protection such that only authorized and knowledgeable operators have access to change the rating of the diesel engine. If the passwords need changing, a master password is used to change the other passwords as shown in block 31. Passing through screens that show the calibration change history 32 indicate whether a test was recently conducted. Separate screens 34, 36, 38 40, 42, 44, 46 and 48 indicate settings of various controls such as idle shut down, variable speed governor (VSG), engine protection, cruise control, progressive shift and engine droop. A screen 52 presents a choice of engine or vehicle controls. Choosing the engine controls, accesses the engine horsepower rating as shown on screen 54.

The electronic control module has the capability of holding more than one rating for a diesel engine. These ratings provide for a primary rating and a corresponding full load rated speed. For example, as shown in FIG. 4, a primary or main rating 56 of 500 horsepower at a full load rated speed 57 of 2110 rpm is illustrated. Most diesel engines also have a droop component 58 beginning at the full load rated speed at the higher end of the curve. The droop component limits operation by reducing the allowable horsepower down to 0 horsepower along a relatively straight curve beginning at the full/load rated speed and ending at a programmable speed of about 150 rpm above the full load rated speed. The droop must end below the overspeed trigger point 55 of 2400 rpm as indicated in this chart.

According to one embodiment of the invention, the ECM also contains a test rating 59, which can be accessed through the DDR. In general, the test rating provides minimal horsepower but allows the engine to exceed the speed of the overspeed trigger point (e.g., speeds up to 2410 rpm).

More specifically, the method set forth for using the DDR to prepare to test the engine for overspeed shut down contains the following steps:

1) Connect the DDR to the diagnostic connector.

2) Turn on the engine ignition and wait for the Reader to communicate with the ECM.

3) On the DDR screen, DDEC III/IV, click <ENTER>and follow the instruction and wait.

4) Select Engine Menu, with arrow keys and hit <ENTER>and wait.

5) On next screen Data list, use arrow <UP>or <DOWN>look for 'Calibration Change'. <ENTER>.

6) Reprogram Cal, <ENTER>.

7) Password, (0000) (for example). Hit <ENTER>.

8) Next screen, use arrow <UP>or <DOWN> look for 'Engine Rating'. <ENTER>.

9) Change Rating, <ENTER>.

10) Password, (0000) (for example). Hit <ENTER>.

11) Use cursor to select #2—0@2410 for overspeed test and <ENTER>. The +will appear in front 0@2410.

12) Click <FUNCTION>.

13) Use arrow Right or Left to select Yes or No. <ENTER>.

14) Click <FUNCTION> again, arrow Right or Left, select Yes and <ENTER>.

15) A saving bar appears, showed change download into ECM program.

16) After the saving, screen showed Reprogram Cal. <ENTER>.

17) Arrow <UP> or <DOWN> look for VSG Calibration <ENTER>.

18) Arrow <UP> or <DOWN> to select VSG Max <ENTER>.

19) Change value to 2410 and <ENTER>.

20) Click <FUNCTION>.

21) Use arrow Right or Left to select Yes or No. <ENTER>.

22) Click <FUNCTION> again, arrow <RIGHT> or <LEFT> to select Yes and <ENTER>.

23) A saving bar appears, showing change download into ECM program.

24) Unload or disconnect external parasitic loads such as the cooling fan hydraulic pump, alternator, air compressor, or others.

25) Start engine and throttle it to overspeed set point.

It is noted that the horsepower available in the test calibration for the overspeed test is minimal so that no useful work can be accomplished by the diesel engine. As such, all accessories, including, e.g., the cooling fan hydraulic pump, alternator, air compressor or other parasitic loads may need to be unloaded. The available horsepower minimally overcomes the parasitic loads or losses of the engine and needed attached rotating components.

Figure 5:
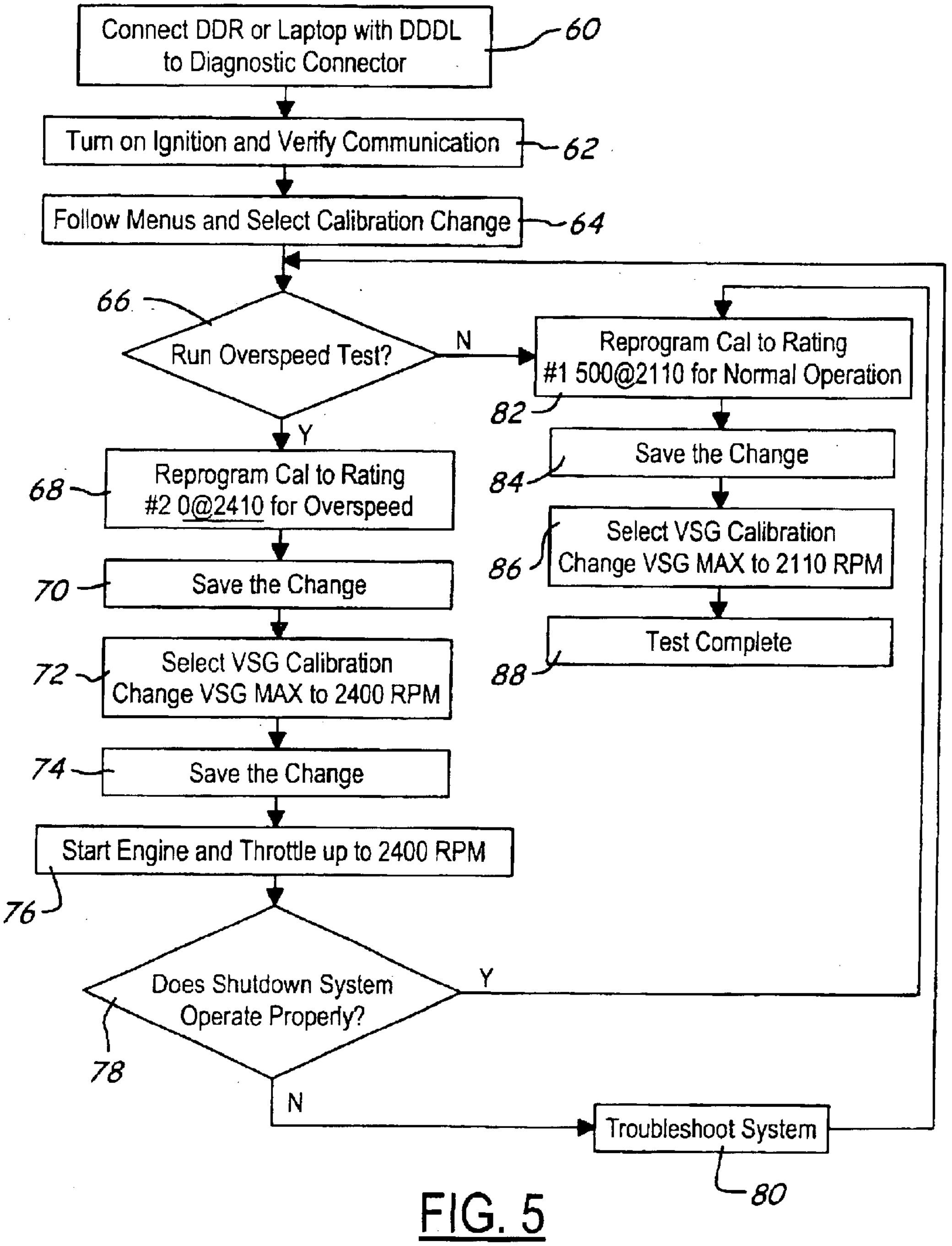
FIG. 5 is a flow chart illustrating the steps of the overspeed test for the shut down system.

The testing phase is more clearly illustrated in FIG. 5. In FIG. 5, the DDR or a proprietary Detroit Diesel Diagnostic Link (ODDL) software package allows access to change the ratings as shown in boxes 60, 62 and 64. The option to run an overspeed test is presented in step 66. If yes, the test calibration 0@2410 (for example) is selected 68 and the change is saved 70. The engine is then started and throttled up to a speed above the overspeed trigger point 76. Once the speed sensor 20 senses >2400 rpm and the ECM 12 properly reads the speed sensor input, it activates an output (digital, analog or frequency signal) 16 to the shut down system as shown in FIG. 1. If the shut down system 18 is operating properly, it will be activated to shut down the engine. If the answer to step 78 is no, then a trouble shooting step 80 occurs and the test procedure is repeated (66).

If the shut down system 18 operates properly, the testing is complete and the DDR is then used to reprogram the engine back to the primary rating for normal operation 82. The change is saved 84 and the Variable Speed Governor is set back to 2110 at step 86 to complete the test procedure 88.

More specifically, when using the DDR the following steps are followed when setting the engine calibration back to its primary or main rating.

26) Plug the DDR to the diagnostic connector.

27) Turn On engine ignition and wait for Reader to communicate with ECM.

28) On the screen, DDEC III/IV, click <ENTER> and follow the instruction and wait.

29) Select Engine Menu, <ENTER> and wait.

30) On next screen Data list, use arrow <UP> or <DOWN> look for 'Calibration Change'. <ENTER>.

31) Reprogram Cal, <ENTER>.

32) Password, (0000) (for example). Hit <ENTER>.

33) Next screen, use arrow <UP> or <Down> look for 'Engine Rating'. <ENTER>.

34) Change Rating, <ENTER>.

35) Password, (0000) (for example). Hit <ENTER>.

36) Use cursor to select #1—500@2110 for example) for normal operation and enter. The +will appear in front 500@2110.

37) Click <FUNCTION>.

38) Use arrow <RIGHT> or <LEFT> to select Yes or No. <ENTER>.

39) Click <FUNCTION> again, arrow <RIGHT> or <LEFT>, select Yes and <ENTER>.

40) A saving bar appears, showed change download into ECM program.

41) After the saving, screen showed Reprogram Cal. <ENTER>.

42) Arrow <UP> or <DOWN>, look for VSG Calibration and <ENTER>.

43) Arrow <UP> or <DOWN> to select VSG Max and <ENTER>.

44) Change value to 2110 (for example) and <ENTER>.

45) Click <FUNCTION>.

46) Use arrow <RIGHT> or <LEFT> to select Yes or No. <ENTER>.

47) Click <FUNCTION> again, arrow <RIGHT> or <LEFT> to select Yes and <ENTER>.

48) A saving bar appears, showed change download into ECM program.

49) Reconnect the cooling fan hydraulic pump, alternator, air compressor, etc. and 50) Start engine.

There is a PC software package which is an alternative to the Diagnostic Data Reader provided by Detroit Diesel named Detroit Diesel Diagnostic Link (DDDL) which also can be used for the overspeed test. The steps are slightly different and set forth as follows to set the test calibration:

1) Connect your notebook computer to the diagnostic connector.

2) Turn On engine ignition.

3) Double click on the DDDL icon on your computer desktop.

4) After opening of DDDL, close the Menu box.

5) On the tool bar, click on the Calibration, on the drop down box select Rating.

6) Rating box showed two ratings, select second rating by click on 0@2400 (for example).

7) Bring your cursor to the calibration password and key (0000) (for example).

8) Bring cursor down to Rating password and key (0000) (for example).

9) Once TRANSMIT box appears, click on it

10) A saving bar appears.

11) After complete saving, close the box.

12) Click Calibration on the tool bar again, on the drop down box select Retrieve.

13) Information in the ECM will retrieve.

14) On the information box select ISD&VSG.

15) Bring cursor to the VSG Max, change the value to 2410.

16) Next, bring the cursor to password and key (0000) (for example).

17) TRANSMIT box appears and click on it.

18) A saving bar appears.

19) After complete saving, close the box.

20) A warning box appears, click No.

21) Unload the cooling fan hydraulic pump, alternator, air compressor or other parasitic loads, if necessary.

22) Start engine and throttle up the engine speed to the overspeed limit.

The following steps are used to set the engine back to its running calibration using the DDDL:

23) Connect your notebook computer to the diagnostic connector.

24) Turn On engine ignition.

25) Double click on the DDDL icon on your computer desktop.

26) After opening of DDDL, close the Menu box.

27) On the tool bar, click on the Calibration, on the drop down box select Rating.

28) Rating box showed two ratings, select first rating by click on 500@2110 (for example).

29) Bring your cursor to the calibration password and key (0000) (for example).

30) Bring cursor down to Rating password and key (0000) (for example).

31) TRANSMIT box appears, click on it.

32) A saving bar appears.

33) After complete saving, close the box.

34) Click Calibration on the tool bar again, on the drop down box select Retrieve.

35) Information in the ECM will retrieve.

36) On the information box select ISD&VSG.

37) Bring cursor to the VSG Max, change the value to 2110 (for example).

38) Next, bring the cursor to password and key (0000) (for example).

39) TRANSMIT box appears, click on it.

40) A saving bar appears.

41) After complete saving, close the box.

42) A warning box appears, click No.

43) Return the cooling fan hydraulic pump, alternator, air compressor or other parasitic loads to normal operating condition; and 44) Start engine.

This above described preferred embodiment is reliable and faster to conduct. Many shut down systems have redundancy built in and have a separate independent trigger sensor built in that independently reads directly from the speed sensor as shown in FIG. 1 (or another speed sensor) without use of the ECM. These set points do not need to be adjusted during the overspeed test because the engine actually goes to a simulated runaway condition which triggers the redundant built in actuators in the shut down system. The elimination of resetting two or three set points saves time and makes the test more reliable and faster to conduct.

It also allows testing of the system settings by simulating an overspeed condition. Certain government and certification agencies and engine operators may require that shut down devices need to be tested at the actual overspeed conditions. Thus, any modified trigger test points or lowering the overspeed trigger point are not acceptable solutions for conducting an automatic shut down test. The above test method provides for actual overspeed conditions that are identical to an overspeed that would shut down the diesel engine when in an actual runaway condition.

The testing calibration is set at a low or nominal horsepower and thus does not allow the engine to do useful work. The horsepower is low enough so that the cooling fan hydraulic pump, alternator, air compressor, and other parasitic loads must be unloaded. The horsepower available is merely sufficient to overcome the diesel engine parasitic losses. This test rating is thus for one purpose only, namely to test for overspeed shut down systems with its needed attached systems. Thus, this test rating may not be characterized as a normal running or primary rating that otherwise may need to meet environmental, or other regulatory or certification requirements. The extremely low horsepower also requires the operator to switch back to the primary rating for useful operation.

Figure 6:
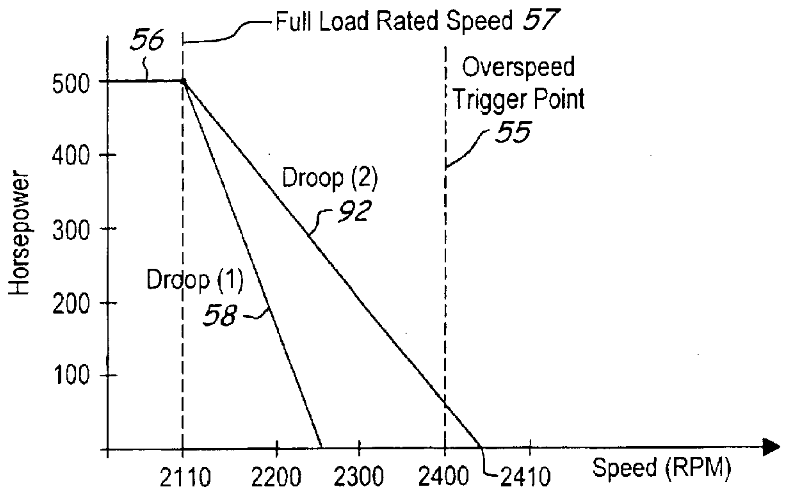
FIG. 6 is an illustration showing the primary rating with a first normal droop rating and a second test droop rating that exceeds the overspeed trigger point.

It is also foreseen that in certain environments or applications that accessibility to the changing of the rating need not be overly restricted and the test may be conducted by any operator in general having access to the engine. In this application, the test rating may be accomplished merely by changing the engine droop 48 as shown in FIG. 3. FIG. 6 illustrates the primary rating 56 with its normal droop calibration 58 of 150 rpm (droop 1). Normal droop is typically set such that it hits the horizontal 0 axis at an rpm less than the overspeed trigger point. In the example shown, the droop hits the 0 horizontal axis at an rpm of about 2260 rpm which is below the overspeed trigger point of 2400 rpm. The droop may be changed through the DDR (or DDDL) by setting the droop rate to a higher calibration, e.g., 300 rpm (droop 2) 92 and provides that the engine can droop to a speed of 2410 rpm. The 2410 rpm speed is noted to be above the overspeed trigger point 55. The 300 rpm droop 92 provides for a test rating that allows the engine to run up to and over the overspeed trigger point of 2400 rpm to actuate the shut down system for test purposes. After the test is successfully conducted, the droop calibration is then changed back to normal droop 58.

Figure 7:
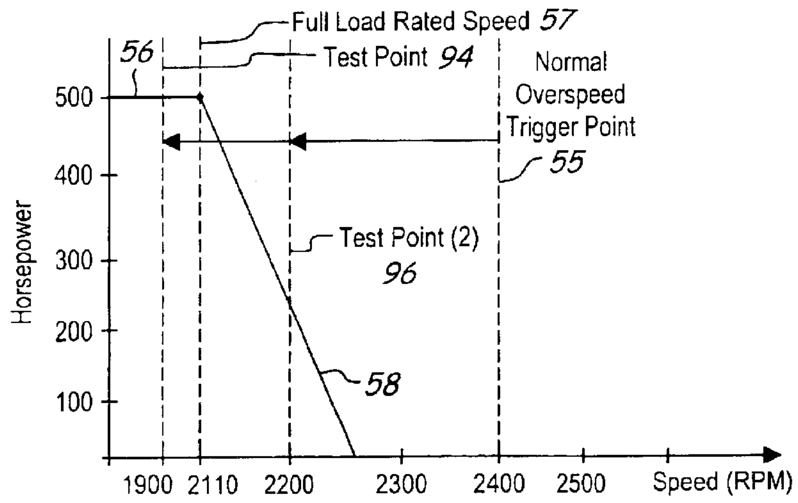
FIG. 7 is an illustration showing the primary rating and a lowered test point of the actuation of the shut down system during normal running of the engine with its primary rating.

It is also foreseen that when certification regulations do not require the simulation of an overspeed runaway condition, other alternative tests may test the shut down systems at lower speeds. This may be accomplished by changing the trigger point to a lower test point level such that the test point is within the normal operating range of the engine which triggers the shut down system instead of changing the primary rating of the engine to allow the engine to speed up to the overspeed trigger point. When the engine is then throttled up to a speed that exceeds the new lower test point, the ECM activates a digital, analog or frequency signal that simulates the same signal activated during overspeed conditions. In this way the shut down systems may be actuated in a test situation within the normal operating range of the engine. As illustrated in FIG. 7, the test point 94 may, for example, be set at 1900 rpm for an engine having a full load rated speed of 2110 rpm at 500 horsepower. After testing, the test point 94 is changed back to the normal overspeed trigger point 58 shown as 2400 rpm. Alternatively, a test point 96 may be set within the range of the droop 58 to provide the test within the normal droop range of the engine.

The lower test point may be changed by a protocol where the ECM is in remote communication (on line) with a main frame computer at the diesel engine manufacturer. The lower test point is set on the main frame computer and downloaded to the ECM. After the test, the lower test point is then changed back to the normal overspeed trigger point on the mainframe computer and then downloaded into the ECM to return the ECM back to its original state.

An alternate method includes using communication protocols such as SAE (J1939) protocol through a CAN bus. The protocol can provide a normally inactive test rating that allows for fueling to exceed the trigger point. The particular throttle command is provided to the ECM to initiate or activate the test rating. After the test, the ECM is reset to inactivate the test rating and reverts the module to the primary rating. The ECM may be easily switched between the primary rating and the test rating.

In this fashion, an electronic control module for an electronically controlled diesel engine can be used to conduct a shut-down system test and more particularly an actual overspeed shut down system test to determine if the shut down system is operating properly at the overspeed trigger point.

Other variations and modifications are possible without departing from the scope and spirit of the present invention as defined by the appended claims.

What is claimed is:

1. A method of testing an overspeed shut down system for an electronically controlled engine, the method comprising:

providing an electronic control module of the engine having a calibration that includes a primary rating that normally limit the operation of said engine to a predetermined full load rated speed and having an overspeed trigger point set above full load rated speed for sending an actuation signal to said shut down system;

enabling the electronic control module of the engine to be set at a test rating for providing fueling of said engine to run at a speed reaching or exceeding said overspeed trigger point that automatically activates said shut down system during said testing;

running said engine with said test rating to a speed reaching or exceeding said predetermined overspeed trigger point; and resetting said electronic control module at the end of said testing to said primary rating.

2. A method as defined in claim 1 further comprising:

said primary rating with a full load rated speed and a first droop component beyond said full load rated speed but below said overspeed trigger point; and said test rating providing a second substantially greater droop component to provide a fueling of the engine to a speed reaching or exceeding the overspeed trigger point.

3. A method as defined in claim 1:

accessing said electronic control module through a computer device having security clearance features for switching the electronic control module between said primary rating and said test rating.

4. A method as defined in claim 1 further comprising:

said test rating set at a horsepower that is minimally sufficient to overcome the parasitic load in said engine and needed engine components comprising; a water pump, fuel pump and oil pump.

5. A method as defined in claim 4 further comprising:

unloading external parasitic loads not necessary for running the engine with the test rating.

6. A method as defined in claim 1 further comprising:

unloading external parasitic loads not necessary for running the engine with the test rating.

7. A method of testing an overspeed shut down system for an electronically controlled engine, said method comprising:

providing an electronic control module of the engine with a primary rating that normally limits the operation of said engine to a predetermined full load rated speed and a normal trigger point normally set above said full load rated speed for sending an actuation signal to said overspeed shut down system;

changing the primary rating to a test rating or alternatively lowering the overspeed trigger point of said electronic control module to allow said engine to run at a speed higher than said overspeed trigger point;

running said engine at a speed higher than the overspeed trigger point to test if said shut down system operates in a proper manner; and resetting said electronic control module to said primary rating and said normal overspeed trigger point.

8. A method as defined in claim 7 further comprising:

changing said primary rating to a test rating includes changing the droop amount from a normal amount set below said overspeed trigger point to an increased amount to exceed said overspeed trigger point.

9. A method as defined in claim 7 further comprising:

lowering the overspeed trigger point to a speed below the full load rated speed of said engine or the droop speed of the engine such that a signal can be used to activate said shut down system when said engine is running within its primary rating.

10. A method as defined in claim 9 further comprising:

said electronic control module digital output for said shut down system having a reverse polarity and normally in a ground position and operable to an open position for activating said shut down system.

11. A method as defined in claim 9 further comprising:

said changing one of the primary rating and said overspeed trigger point includes setting at a remote secure computer and providing a communication link between said remote secure computer and said electronic control module.

12. A method as defined in claim 7 further comprising:

providing an electronic control module of the engine having a primary rating that normally limits the operation of said engine to a predetermined full load rated speed and an overspeed trigger point set above said full load rated speed for sending an actuating signal to said shut down system and a normal test rating to provide fueling to a test speed above said full load rated speed and above said overspeed trigger point;

providing a throttle command to said electronic control module to activate said test rating to provide said test speed to actuate said shut down system; and resetting to inactivate said test rating and reverting to said primary rating with said normal test rating.

* * * * *